(12) United States Patent
Ishizaka et al.

(10) Patent No.: US 9,541,122 B2
(45) Date of Patent: Jan. 10, 2017

(54) OUTBOARD MOTOR

(71) Applicant: HONDA MOTOR CO., LTD., Minato-ku, Tokyo (JP)

(72) Inventors: Kazuhiro Ishizaka, Wako (JP); Yoshihiko Fukuda, Wako (JP); Haruo Tsusaka, Wako (JP); Tetsuro Ikeno, Wako (JP); Tomoharu Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 14/638,373

(22) Filed: Mar. 4, 2015

(65) Prior Publication Data
US 2015/0252838 A1 Sep. 10, 2015

(30) Foreign Application Priority Data

Mar. 6, 2014 (JP) .................................. 2014-043543

(51) Int. Cl.
*F16D 3/12* (2006.01)
*F16C 3/06* (2006.01)
*B63H 20/14* (2006.01)
*F16C 17/04* (2006.01)
*F16C 17/22* (2006.01)

(52) U.S. Cl.
CPC ................. *F16C 3/06* (2013.01); *B63H 20/14* (2013.01); *F16C 17/04* (2013.01); *F16C 17/22* (2013.01); *F16C 2360/22* (2013.01); *Y10T 74/2178* (2015.01)

(58) Field of Classification Search
CPC ............. F16C 3/06; F16C 17/04; F16C 17/22; F16C 2360/22; B63H 20/14; Y10T 74/2178
USPC .... 464/68.92, 107, 169; 123/195 HC, 195 P; 440/83; 384/233, 430; 267/178
See application file for complete search history.

(56) References Cited

U.S. PATENT DOCUMENTS

| | | | | |
|---|---|---|---|---|
| 1,031,530 A | * | 7/1912 | Courtney | B60B 9/06 267/178 X |
| 1,653,108 A | * | 12/1927 | Koenig | B24B 23/02 464/169 X |
| 1,886,191 A | * | 11/1932 | Johnson | B63H 20/14 |
| 2,914,929 A | * | 12/1959 | Irons | F16D 41/22 464/169 X |
| 5,064,042 A | * | 11/1991 | Kuhne | F16D 3/12 464/68.92 X |
| 5,112,259 A | * | 5/1992 | McElroy, Jr. | B63H 21/28 440/83 X |

FOREIGN PATENT DOCUMENTS

JP 2013-238277 A 11/2013

\* cited by examiner

*Primary Examiner* — Gregory Binda
(74) *Attorney, Agent, or Firm* — Carrier Blackman & Associates, P.C.; Joseph P. Carrier; William D. Blackman

(57) ABSTRACT

In an outboard motor adapted to be mounted on a hull and equipped with an engine having a crankshaft located parallel with a gravity axis and a vertical shaft connected to the crankshaft to be rotated around the gravity axis, an urger is disposed at a position between the crankshaft and the vertical shaft to urge the crankshaft upward in a direction parallel with the gravity axis.

7 Claims, 5 Drawing Sheets

OUTBOARD MOTOR

BACKGROUND

Technical Field

An embodiment of this invention relates to an outboard motor.

Background Art

In an engine of outboard motor or vehicle, there have been proposed a variety of bearing structures of crankshaft having a journal supporting part of a cylinder block to rotatably support a crank journal connected to a crank arm, a journal bearing installed between the crank journal and journal supporting part to receive load in the radial direction of the crank journal, and a thrust bearing installed between the crank arm and journal supporting part to receive load in the axial direction (thrust direction) of the crankshaft, for example, by Japanese Laid-Open Patent Application No. 2013-238277.

In the above mentioned reference, although it is not limited to the outboard motor, there is disclosed a technology to prevent butting between a slide-contact surface of the thrust bearing and crank arm, by providing an inclined part etc., on the slide-contact surface of the thrust bearing with the crank arm even when the journal supporting part is deformed due to bolt fastening during assembly of an engine and the like.

SUMMARY

In so-called vertical engine, for example, in the engine of the outboard motor, where the crankshaft is located parallel with the gravity axis (vertical axis), since the thrust bearing receives load of the crankshaft etc. from upper side, the thrust bearing and crank arm come into contact with each other. Thus, if the engine is new and initial running-in (conformability of the slide-contact surfaces) is not sufficient, or if thermal deformation of the cylinder block and the like occurs with increasing engine temperature, large load and heat are generated on the slide-contact surface of the thrust bearing that may sometimes cause surface peeling, abnormal wear and other defects of the thrust bearing.

Therefore, an embodiment of this invention is directed to overcome the foregoing problems by providing an outboard motor having an engine crankshaft located parallel with the direction of gravity that prevents load of the crankshaft etc. from applying to the thrust bearing.

In order to achieve the object, the embodiment of this invention provides, in an aspect, an outboard motor (10) adapted to be mounted on a hull (16) and equipped with an engine (18) having a crankshaft (20) located parallel with a gravity axis and a vertical shaft (42) connected to the crankshaft to be rotated around the gravity axis, comprising: an urger (coil spring 50) disposed at a position between the crankshaft and vertical shaft to urge the crankshaft upward in a direction parallel with the gravity axis.

BRIEF DESCRIPTION OF THE DRAWINGS

The above and other objects and advantages of an embodiment of this invention will be more apparent from the following description and drawings in which.

DESCRIPTION OF EMBODIMENT

An outboard motor according to an embodiment of this invention will be explained with reference to the attached drawings.

Figure 1:
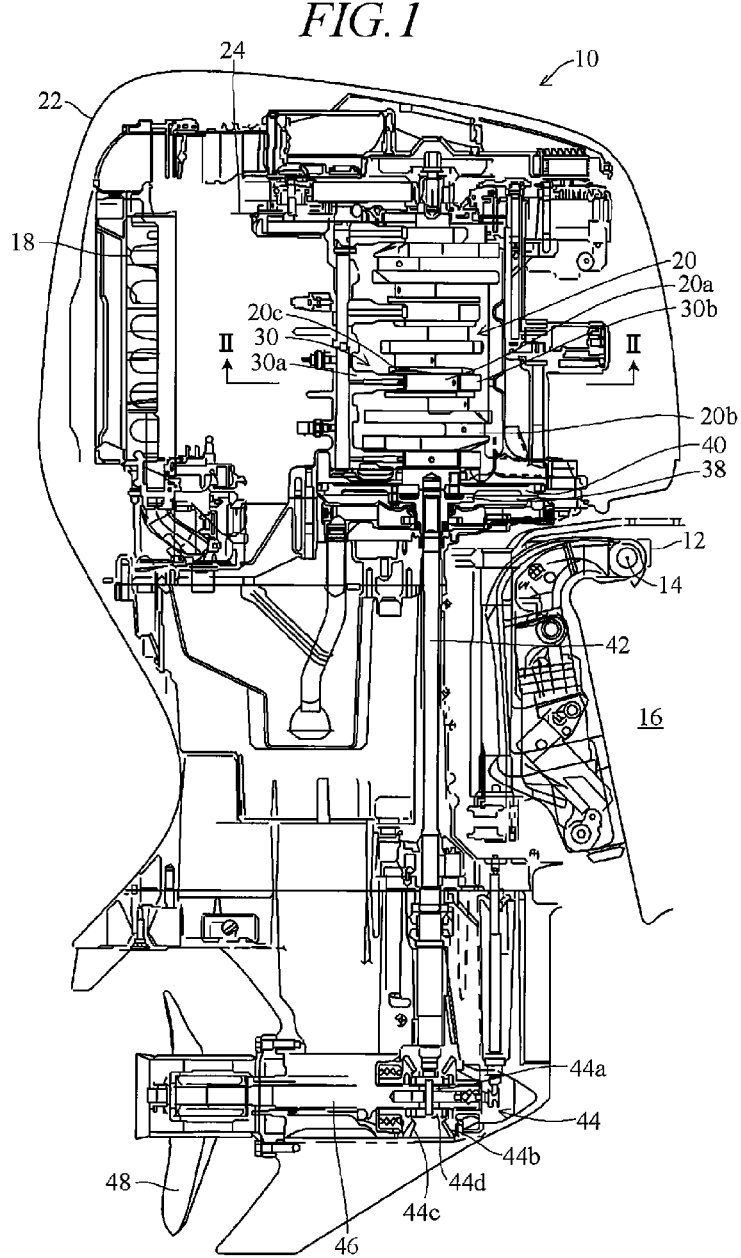
FIG. 1 is a partial cross-sectional side view of an outboard motor according to an embodiment of this invention.
Figure 2:
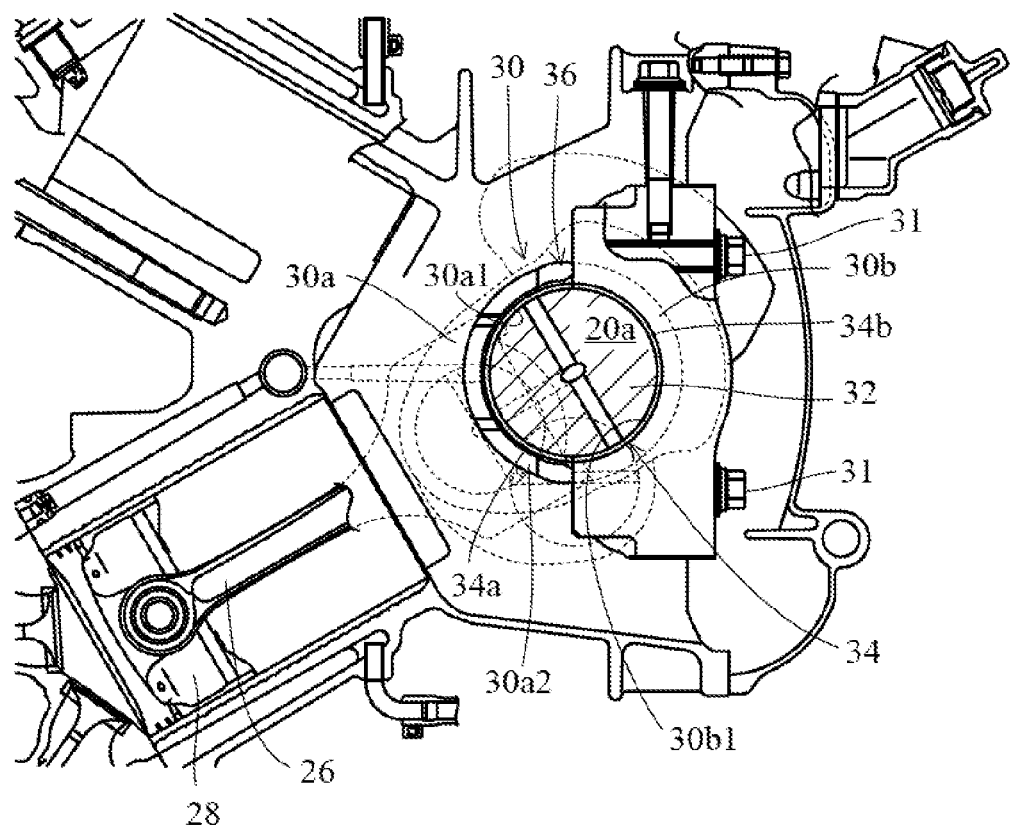
FIG. 2 is a cross-sectional view in a direction along plane II-II in FIG. 1 showing a partial enlarged cross-sectional view of the vicinity of a crank journal of a crankshaft shown in FIG. 1, viewed from an axial direction.
Figure 3:
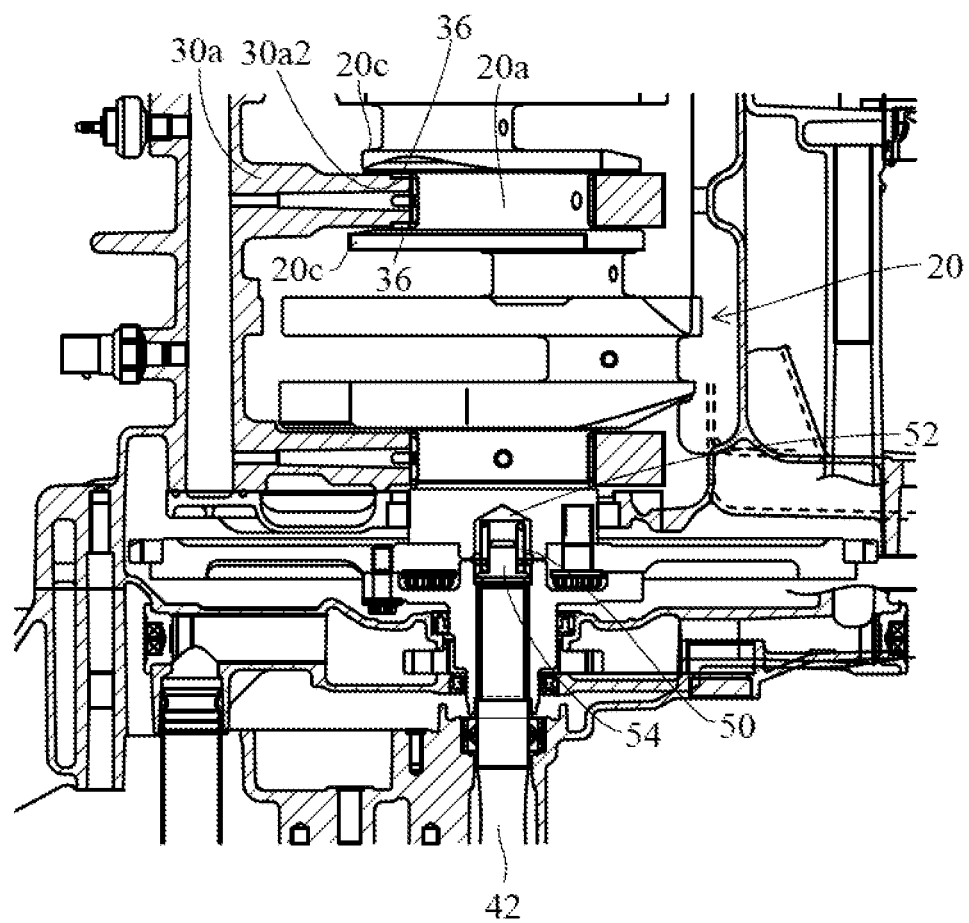
FIG. 3 is an enlarged cross-sectional view partially showing the vicinity of the connecting portion of the crankshaft and vertical shaft shown in FIG. 1.
Figure 4:
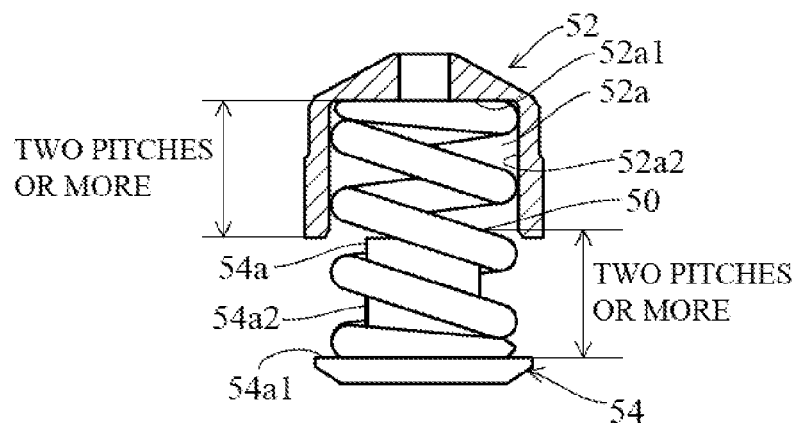
FIG. 4 is an explanatory view for explaining a coil spring, spring retainer and spring sheet shown in FIG. 3.

FIG. 1 is a partial cross-sectional side view of an outboard motor according to an embodiment of this invention, FIG. 2 is a partial enlarged cross-sectional view of the vicinity of a crank journal of a crankshaft shown in FIG. 1, viewed from an axial direction, FIG. 3 is an enlarged cross-sectional view partially showing the vicinity of the connecting portion of the crankshaft and vertical shaft shown in FIG. 1, and FIG. 4 is an explanatory view for explaining a coil spring, spring retainer and spring sheet shown in FIG. 3.

In FIG. 1, symbol 10 indicates an outboard motor. The outboard motor 10 is installed on a stern or transom of a hull 16 through stern brackets 12 and a tilting shaft 14. The outboard motor 10 is mounted at its upper portion with an engine (internal combustion engine) 18. The engine 18 comprises a spark-ignition, water-cooled, multi-cylinder gasoline engine with a displacement of about 2,000 cc. The engine 18 is mounted on the outboard motor 10 so that a crankshaft 20 is located parallel with the direction of gravity (gravity axis). In the outboard motor 10, the engine 18 is positioned above the water surface and covered by an engine cover 22.

The crankshaft 20 is accommodated in a cylinder block 24 of the engine 18. The crankshaft 20 comprises a plurality of crank journals 20a that are located on the rotation center axis of the crankshaft 20 and constitute the main rotation axis of the crankshaft 20, a plurality of crank pins 20b connected to pistons 28 through connecting rods 26 (shown in FIG. 2), and a plurality of crank arms 20c that connect the crank pins 20b to the crank journals 20a in an eccentric state.

The crankshaft 20 is rotatably supported on the cylinder block 24. In concrete, the crank journals 20a of the crankshaft 20 are rotatably supported on journal supporting parts 30 formed on the cylinder block 24.

As shown in FIG. 2, the journal supporting part 30 comprises a bulk part 30a that supports a portion corresponding to about half of an outer circumference of each crank journal 20a from the piston side (left side in the figure), and a bearing cap 30b that supports a portion corresponding to the remaining half from the opposite side of the bulk part 30a (crankcase side (right side in the figure)).

A semicircular journal supporting surface 30a1 is formed on the bulk part 30a, which supports an outer circumferential surface of the crank journal 20a. And, same as the bulk part 30a, a semicircular journal supporting surface 30b1 is formed on the bearing cap 30b, which supports the outer circumferential surface of the crank journal 20a.

Thus, the bulk part 30a and bearing cap 30b are fastened by bolts 31 such that the crank journal supporting surfaces 30a1, 30b1 of the bulk part 30a and bearing cap 30b are disposed facing each other, thereby a cylindrical journal inserting hole 32 for inserting each crank journal 20a is formed by these two facing crank journal supporting surfaces 30a1, 30b1.

A main metal (journal (radial) bearing) 34 is provided on an inner circumferential surface of the journal inserting hole 32, which slide contacts the outer circumferential surface of the crank journal 20a and receives load in the radial direction of the crank journal 20a. The main metal 34 is a sliding bearing that comprises a cylindrical member of two-divided (halved) structure. A main metal 34a constituting one half semicircular cylindrical member is disposed on the journal supporting surface 30a1 of the bulk part 30a, and a main metal 34b constituting the other half semicircular cylindrical member is disposed on the journal supporting surface 30b1 of the bearing cap 30b.

As shown in FIG. 3, a semicircular (half-doughnut shape; shown in FIG. 2) thrust groove 30a2 is formed on both sides of one or more bulk part 30a among the plurality of bulk parts 30a in the axial direction of the crankshaft 20 (vertical direction in the figure), in other words, on the opposing surfaces of the crank arms 20c located upper and lower sides of the bulk part 30a, respectively along the peripheral portion of the journal inserting hole 32.

A thrust washer (thrust bearing) 36 of approximately the same shape (semicircular shape) as the thrust groove 30a2 is fitted in the thrust groove 30a2. The thrust washer (thrust bearing) 36 comprises a sliding bearing that receives load in the axial direction of the crankshaft 20. It should be noted that, since the thrust washer 36 is fitted in the two thrust grooves 30a2 formed on the both sides in the axial direction of the bulk part 30a respectively, one bulk part 30a is provided with two thrust washers 36 in total, i.e., the thrust washer 36 that abuts on the bulk part 30a from the upper side and the thrust washer 36 that abuts on the bulk part 30a from the lower side.

As described above, the journal supporting part 30 is provided with the main metal 34 that receives load in the radial direction of the crankshaft 20 and the thrust washer 36 that receives load in the axial direction of the crankshaft 20.

Returning to the explanation of FIG. 1, the crankshaft 20 is connected to a flywheel 40 through a flywheel boss 38 and rotatably connected to a vertical shaft 42 around the gravity axis, on one end (lower end in the figure).

The vertical shaft 42 is disposed parallel with the rotation center axis of the crankshaft 20, specifically disposed coaxially with the rotation axis of the crank journal 20a and parallel with the gravity axis, and is adapted to rotate around the gravity axis by output power of the engine 18, i.e., rotation of the crankshaft 20. The rotation of the vertical shaft 42 is transmitted to the gear mechanism 44, and then converted to rotation around the horizontal axis, thereby transmitted to a propeller 48 through a propeller shaft 46.

The gear mechanism 44 comprises a pinion gear 44a that is disposed on the lower end of the vertical shaft 42, a forward bevel gear 44b and reverse bevel gear 44c that are engaged (meshed) with the pinion gear 44a to be rotated in opposed directions, and a clutch 44d that makes the propeller shaft 46 engageable with one of the forward bevel gear 44b and reverse bevel gear 44c. The gear mechanism 44 is prepared to change a shift position to forward, reverse or neutral by operating a clutch 44d using a shifting electric motor (not shown).

As shown in FIG. 3, a coil spring 50 is disposed at a position between the crankshaft 20 and vertical shaft 42. The coil spring 50 is connected to the crankshaft 20 through a spring retainer (first spring supporting member) 52 on one end, and connected to the vertical shaft 42 through a spring sheet (second spring supporting member) 54 on the other end.

As shown in FIG. 4, the spring retainer 52 has a concave part 52a of a bottomed cylindrical shape that can be fitted to an outer side (outer periphery) of the coil spring 50, and is configured to support one end of the coil spring 50 at a bottom part 52a1 of the concave part 52a and to cover the outer periphery of the coil spring 50 with an inner wall surface 52a2 of the concave part 52a when fitted to the coil spring 50.

The spring sheet 54 has a convex part 54a of a columnar shape that can be fitted to an inner side (inner periphery) of the coil spring 50, and is configured to support the other end of the coil spring 50 at a pedestal 54a1 that is to be a base seat of the convex part 54a and to be fitted to the inner periphery of the coil spring 50 at the columnar outer circumferential surface 54a2 of the convex part 54a when fitted to the coil spring 50.

As mentioned above, the crankshaft 20 and vertical shaft 42 are connected by the coil spring 50 through the spring retainer 52 and spring sheet 54, and the coil spring 50 is configured to urge the crankshaft 20 upward in a direction parallel with the gravity axis against load of the crankshaft 20 etc.

Figure 5:
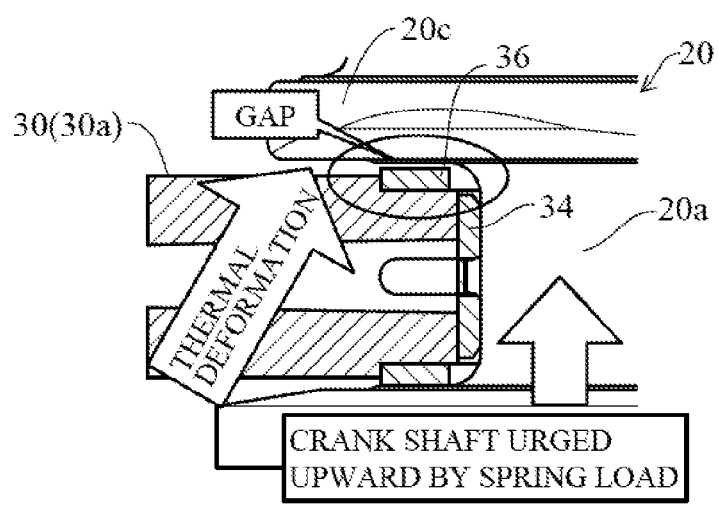
FIG. 5 is an explanatory view for explaining a state in the vicinity of a thrust washer shown in FIG. 3 when the coil spring is disposed at a position between the crankshaft and vertical shaft.
Figure 6:
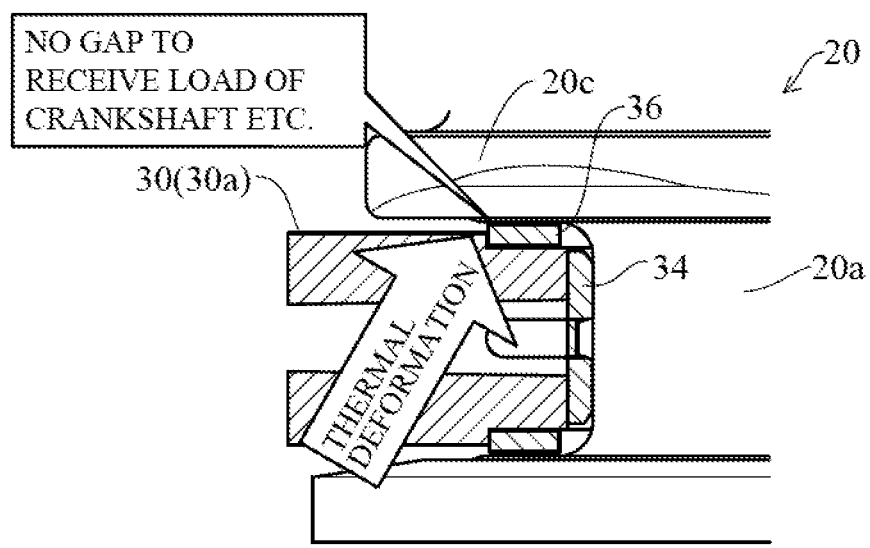
FIG. 6 is an explanatory view for explaining a state in the vicinity of a conventional (prior art) thrust washer, in which the coil spring is out of the position between the crankshaft and vertical shaft.

FIG. 5 is an explanatory view for explaining a state in the vicinity of a thrust washer 36 when the coil spring 50 is disposed at a position between the crankshaft 20 and vertical shaft 42, and FIG. 6 is an explanatory view for explaining a state in the vicinity of a conventional thrust washer 36, in which the coil spring 50 is out of the position between the crankshaft 20 and vertical shaft 42.

As shown in FIG. 5, since the crankshaft 20 is urged upward by the coil spring 50, a slight gap is formed between the thrust washer 36 disposed on the upper side of the bulk part 30a, and the crank arm 20c, thereby prevent the load of the crankshaft 20 etc. from applying to the thrust washer 36 from upper side.

On the contrary, as shown in FIG. 6, in the state in the vicinity of the conventional thrust washer 36, in which the coil spring 50 is out of the position between the crankshaft 20 and vertical shaft 42, the load of the crankshaft 20 etc. is always applied to the thrust washer 36 disposed at the upper side of the bulk part 30a by gravity so that the thrust washer 36 and crank arm 20c are forced to come into contact with each other. Thus, for example, if thermal deformation of the cylinder block 24 (bulk part 30a) and the like occurs with increasing engine temperature, large load and heat are generated on the slide-contact surface of the thrust washer 36 that cause surface peeling, abnormal wear and other defects of the thrust washer 36. To make matters worse, the heat generated on the slide-contact surface of the thrust washer 36 can be transmitted to the main metal 34 through the bulk part 30a and sometimes causes surface peeling of the main metal 34.

However, as mentioned above, by urging the crankshaft 20 upward by the coil spring 50 to form the slight gap between the thrust washer 36 and crank arm 20c, since it becomes possible to create a state where the thrust washer 36 never receives the load of the crankshaft 20 etc., the crank arm 20c and thrust washer 36 never come into strong contact with each other as happened before in the prior art and it becomes possible to prevent heat generation and wear of the slide-contact surface of the thrust washer 36 even when the bulk part 30a is thermally deformed to push the thrust washer 36 upward.

It should be noted that, in the explanation of FIG. 5, although the slight gap is formed between the thrust washer 36 and crank arm 20c, it is not necessary to form an apparent gap between the thrust washer 36 and crank arm 20c so far as the state where the thrust washer 36 does not receive the load of the crankshaft 20 etc. is maintained.

Returning to the explanation of FIG. 4, depth of the concave part 52a of the spring retainer 52 and height of the convex part 54a of the spring sheet 54 are set to be equal to or greater than two pitches of the coil spring 50 respectively when the coil spring 50 is out of the position between the crankshaft 20 and vertical shaft 42, i.e., when the coil spring 50 is free.

It becomes possible to prevent the coil spring 50 from detaching, tipping over or bending in the lateral direction orthogonal to the expanding/contracting direction of the coil spring 50, and the like, during connection (assembly) of the coil spring 50 to the crankshaft 20 and vertical shaft 42 through the spring retainer 52 and spring sheet 54, by setting the depth of the concave part 52a of the spring retainer 52 and the height of the convex part 54a of the spring sheet 54 to be equal to or greater than two pitches of the coil spring 50 respectively.

As stated above, the embodiment of this invention is configured to have an outboard motor (10) adapted to be mounted on a hull (16) and equipped with an engine (18) having a crankshaft (20) located parallel with a gravity axis and a vertical shaft (42) connected to the crankshaft to be rotated around the gravity axis, comprising: an urger (coil spring 50) disposed at a position between the crankshaft and vertical shaft to urge the crankshaft upward in a direction parallel with the gravity axis. With this, it becomes possible to prevent load of the crankshaft 20 etc. from applying to the thrust bearing (thrust washer) 36 from upper side. Thus, since load and heat generated on the slide-contact surface of the thrust bearing (thrust washer) 36 is little, it becomes possible to prevent surface peeling, abnormal wear or the like of the thrust bearing (thrust washer) 36.

In the outboard motor, the urger comprises a coil spring (50). With this, in addition to the effects and advantages mentioned above, it becomes possible to prevent the load of the crankshaft 20 etc. from applying to the thrust bearing (thrust washer) 36 from upper side in simple configuration.

In the outboard motor, the coil spring is connected at one end to the crankshaft through a first spring supporting member (spring retainer 52) that is adapted to be fitted to the coil spring, and is connected at an other end to the vertical shaft through a second spring supporting member (spring sheet 54) that is adapted to be fitted to the coil spring. With this, in addition to the effects and advantages mentioned above, it becomes possible to reliably fix the coil spring 50 to the crankshaft 20 and vertical shaft 42.

In the outboard motor, the first spring supporting member has a concave part (52a) that is adapted to be fitted to an outer side of the coil spring, and a depth of the concave part is set to be equal to or greater than two pitches of the coil spring when the coil spring is out of the position between the crankshaft and the vertical shaft. With this, in addition to the effects and advantages mentioned above, it becomes possible to more reliably fix the coil spring 50 to the crankshaft 20 and to prevent the coil spring 50 from detaching, tipping over or bending in the lateral direction orthogonal to the expanding/contracting direction, and the like, during connection (assembly) of the coil spring 50 to the crankshaft 20.

In the outboard motor, the second spring supporting member has a convex part (54a) that is adapted to be fitted to an inner side of the coil spring, and a height of the convex part is set to be equal to or greater than two pitches of the coil spring when the coil spring is out of the position between the crankshaft and the vertical shaft. With this, in addition to the effects and advantages mentioned above, it becomes possible to more reliably fix the coil spring 50 to the vertical shaft 42 and to prevent the coil spring 50 from detaching, tipping over or bending in the lateral direction orthogonal to the expanding/contracting direction, and the like, during connection (assembly) of the coil spring 50 to the vertical shaft 42.

In the outboard motor, the concave part is of a bottomed cylindrical shape having a bottom part (52a1), and is adapted to support one end of the coil spring at the bottom part and cover an outer periphery of the coil spring with an inner wall surface (52a2) of the concave part when fitted to the coil spring. With this, in addition to the effects and advantages mentioned above, it becomes possible to surely support the coil spring 50 by the crankshaft 20.

In the outboard motor, the convex part is of a columnar shape having a pedestal (54a1) acting as a base seat and a columnar outer circumferential surface (54a2), and is adapted to support an other end of the coil spring at the pedestal and is fitted to an inner periphery of the coil spring at the columnar outer circumferential surface when fitted to the coil spring. With this, in addition to the effects and advantages mentioned above, it becomes possible to surely support the coil spring 50 by the vertical shaft 42.

It should be noted that, in the embodiment, although the coil spring 50 is out of the position between the crankshaft 20 and vertical shaft 42, it should not be limited to the coil spring 50 and an urging means that can urges the crankshaft 20 upward in a direction parallel with the gravity axis can instead be used.

It should further be noted that, in the embodiment, although the spring retainer 52 having the concave part 52a is provided on the upper end of the coil spring 50 and the spring sheet 54 having the convex part 54a is provided on the lower end of the coil spring 50, the spring sheet 54 can be provided on the upper end of the coil spring 50 and the spring retainer 52 on the lower end.

Japanese Patent Application No. 2014-043543, filed on Mar. 6, 2014, is incorporated by reference herein in its entirety.

While the invention has thus been shown and described with reference to a specific embodiment, it should be noted that the invention is in no way limited to the details of the described arrangement; changes and modifications may be made without departing from the scope of the appended claims.

What is claimed is:

1. An outboard motor configured to be mounted on a hull, comprising:
   an engine including a crankshaft disposed parallel to a gravity axis and a cylinder block, the crankshaft including a crank journal constituting a main rotation axis of the crankshaft, a crank pin connected to a piston through a connecting rod, and a crank arm connecting the crank pin to the crank journal in an eccentric state, the cylinder block including a journal supporting part rotatably supporting an outer circumferential surface of the crank journal;

a vertical shaft connected to the crankshaft to be rotated around the gravity axis;

a thrust bearing disposed between the journal supporting part and the crank arm in an axial direction of the crankshaft; and an urger disposed at a position between the crankshaft and the vertical shaft to urge the crankshaft upward in a direction parallel with the gravity axis.

2. The outboard motor according to claim 1, wherein the urger comprises a coil spring.

3. The outboard motor according to claim 2, wherein the coil spring is connected at one end to the crankshaft through a first spring supporting member that is configured to be fitted to the coil spring, and is connected at an other end to the vertical shaft through a second spring supporting member that is configured to be fitted to the coil spring.

4. The outboard motor according to claim 3, wherein the first spring supporting member has a concave part that is adapted to be fitted about an outer side of the coil spring, and a depth of the concave part is set to be equal to or greater than two pitches of the coil spring when the coil spring is out of the position between the crankshaft and the vertical shaft.

5. The outboard motor according to claim 4, wherein the concave part is of a bottomed cylindrical shape having a bottom part, and is configured to support one end of the coil spring at the bottom part and cover an outer periphery of the coil spring with an inner wall surface of the concave part when fitted to the coil spring.

6. The outboard motor according to claim 3, wherein the second spring supporting member has a convex part that is adapted to be fitted within an inner side of the coil spring, and a height of the convex part is set to be equal to or greater than two pitches of the coil spring when the coil spring is out of the position between the crankshaft and the vertical shaft.

7. The outboard motor according to claim 6, wherein the convex part is of a columnar shape having a pedestal acting as a base seat and a columnar outer circumferential surface, and is configured to support an other end of the coil spring at the pedestal and is fitted within an inner periphery of the coil spring at the columnar outer circumferential surface when fitted to the coil spring.

* * * * *